(12) United States Patent
Minato et al.

(10) Patent No.: US 10,105,634 B2
(45) Date of Patent: Oct. 23, 2018

(54) COMPRESSED AIR-DRYING DEVICE

(71) Applicant: NABTESCO AUTOMOTIVE CORPORATION, Tokyo (JP)

(72) Inventors: Ichiro Minato, Tokyo (JP); Takuya Sugio, Tokyo (JP); Masanori Momoki, Tokyo (JP); Hiroyuki Murakami, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 57 days.

(21) Appl. No.: 15/103,046

(22) PCT Filed: Dec. 12, 2014

(86) PCT No.: PCT/JP2014/083047
§ 371 (c)(1),
(2) Date: Jun. 9, 2016

(87) PCT Pub. No.: WO2015/088027
PCT Pub. Date: Jun. 18, 2015

(65) Prior Publication Data
US 2016/0375396 A1    Dec. 29, 2016

(30) Foreign Application Priority Data

Dec. 12, 2013    (JP) ................................. 2013-256909

(51) Int. Cl.
*B01D 53/02*    (2006.01)
*B01D 53/04*    (2006.01)
(Continued)

(52) U.S. Cl.
CPC ..... *B01D 53/0407* (2013.01); *B01D 53/0423* (2013.01); *B01D 53/261* (2013.01);
(Continued)

(58) Field of Classification Search
CPC ...... B01D 2257/702; B01D 2259/4566; B01D 53/0407; B01D 53/0423; B01D 53/261;
(Continued)

(56) References Cited

U.S. PATENT DOCUMENTS 3,004,833 A * 10/1961 Loewen .................... B03C 3/70
                                                              423/456
3,181,285 A *  5/1965 Tepolt ....................... B03C 3/16
                                                                96/79
(Continued)

FOREIGN PATENT DOCUMENTS

| JP | 2012-106155 A | 6/2012 |
|---|---|---|
| WO | WO 2013/129495 A1 | 9/2013 |
| WO | WO 2013/129496 A1 | 9/2013 |

OTHER PUBLICATIONS

International Preliminary Report on Patentability and the Written Opinion of the International Searching Authority as issued in International Patent Application No. PCT/JP2014/083047, dated Jun. 14, 2016.

(Continued)

*Primary Examiner* — Christopher P Jones
(74) *Attorney, Agent, or Firm* — Pillsbury Winthrop Shaw Pittman LLP

(57) ABSTRACT

A compressed air drier includes a support base, a desiccant cartridge coupled to the support base, and a case that covers the cartridge and is coupled to the support base. The support base includes an inlet for compressed air from a compressor, an outlet for the compressed air, and a discharge port for oil and water including a drain valve device. An electrically charged oil adsorbent is accommodated between the cartridge and the case. The cartridge is filled with a desiccant. The compressed air drier dries the compressed air entering the inlet with the desiccant during a loading operation, collects the dried compressed air in the case, and discharges (Continued)

the dried compressed air from the outlet. The compressed air drier passes the compressed air in the case through the cartridge during an unloading operation to discharge oil and water from the discharge port.

8 Claims, 4 Drawing Sheets

(51) Int. Cl.
| | |
|---|---|
| *F04B 39/16* | (2006.01) |
| *B01D 53/26* | (2006.01) |
| *B03C 3/30* | (2006.01) |
| *B03C 3/017* | (2006.01) |
| *B01J 20/28* | (2006.01) |

(52) U.S. Cl.
CPC ......... *B01J 20/28045* (2013.01); *B03C 3/017* (2013.01); *B03C 3/30* (2013.01); *F04B 39/16* (2013.01); *B01D 2257/702* (2013.01); *B01D 2259/4566* (2013.01); *B01J 2220/62* (2013.01)

(58) Field of Classification Search
CPC . B01J 20/28045; B01J 2220/62; B03C 3/017; B03C 3/30; F04B 39/16
See application file for complete search history.

(56) References Cited

U.S. PATENT DOCUMENTS

| | | | | |
|---|---|---|---|---|
| 5,055,115 A | * | 10/1991 | Yikai | ..................... B01D 53/32 96/59 |
| 5,110,330 A | * | 5/1992 | Loughran | ............ B01D 53/261 55/485 |
| 5,271,762 A | * | 12/1993 | Schoofs | ............... B01D 53/261 95/115 |
| 5,961,698 A | * | 10/1999 | Dossaji | .............. B01D 53/0415 34/80 |
| 2005/0188848 A1 | * | 9/2005 | Salzman | ................ B01D 45/08 96/134 |
| 2006/0144226 A1 | * | 7/2006 | Damrath | .............. B01D 53/261 95/90 |
| 2008/0307965 A1 | * | 12/2008 | Hoffman | ................ B01D 45/16 95/119 |
| 2012/0006198 A1 | * | 1/2012 | Honjo | ................ B01D 53/0415 96/139 |
| 2012/0255437 A1 | * | 10/2012 | Fornof | ................. B01D 53/261 95/45 |
| 2013/0074460 A1 | * | 3/2013 | Sakuragi | ................ B01D 46/42 55/471 |
| 2014/0144326 A1 | | 5/2014 | Minato et al. | |
| 2015/0033685 A1 | | 2/2015 | Sugio et al. | |
| 2015/0040767 A1 | | 2/2015 | Sugio et al. | |
| 2015/0052861 A1 | | 2/2015 | Sugio et al. | |
| 2015/0135961 A1 | | 5/2015 | Sugio et al. | |
| 2015/0343356 A1 | * | 12/2015 | Sugio | ..................... B01D 45/08 55/462 |

OTHER PUBLICATIONS

International Search Report as issued in International Patent Application No. PCT/JP2014/083047, dated Mar. 3, 2015.

* cited by examiner

COMPRESSED AIR-DRYING DEVICE

CROSS-REFERENCE TO RELATED APPLICATIONS

This application is the U.S. National Stage of PCT/JP2014/083047, filed Dec. 12, 2014, which in turn claims priority to Japanese Patent Application No. JP 2013-256909, filed Dec. 12, 2013. The contents of these applications are incorporated herein by reference in their entireties.

TECHNICAL FIELD

The present invention relates to a compressed air drier that dries compressed air supplied from a compressor.

BACKGROUND ART

A compressed air drier includes a support base, a desiccant cartridge filled with a desiccant, and an outer case that covers the desiccant cartridge and is coupled to the support base. The support base includes an inlet, through which compressed air supplied from a compressor enters, and a drain port, which includes a draining device (for example, refer to patent document 1).

The compressed air drier performs a loading operation that removes moisture. During the loading operation, the compressed air entering the inlet is passed through the desiccant cartridge. The dried compressed air is collected in the outer case and supplied to an air tank from an outlet. Further, the compressed air drier performs an unloading operation that regenerates the desiccant. During the unloading operation, a drain valve of the draining device opens so that the dried compressed air collected in the outer case is passed through the desiccant cartridge in a direction opposite to the loading operation so that water is discharged from the drain valve. The compressed air drier periodically repeats the loading operation and the unloading operation.

In addition to the desiccant cartridge, a filter element is arranged in the compressed air drier to remove oil and dust from the compressed air.

PRIOR ART DOCUMENT

Patent Document
  Japanese Laid-Open Patent Publication No. 2012-106155

SUMMARY OF THE INVENTION

Problems that are to be Solved by the Invention

In the compressed air drier described above, compressed air is passed through the desiccant and the filter element. However, oil remains in the compressed air that has been passed through the desiccant and the filter element. It is thus desired that the rate for removing oil from the compressed air be increased.

It is an object of the present invention to provide a compressed air drier that increases the rate for removing oil from compressed air.

Means for Solving the Problem

A means for solving the problem and the effect of the means will now be described.

To solve the above problem, a compressed air drier includes a support base including an inlet for compressed air from a compressor, an outlet for the compressed air, and a discharge port for oil and water including a drain valve device. A desiccant cartridge is coupled to the support base. A case that covers the desiccant cartridge is coupled to the support base. An electrically charged oil adsorbent is accommodated between the desiccant cartridge and the case. The desiccant cartridge is filled with a desiccant. The compressed air drier dries the compressed air entering the inlet with the desiccant during a loading operation, collects the dried compressed air in the case, and discharges the dried compressed air from the outlet. Further, the compressed air drier passes the compressed air in the case through the desiccant cartridge during an unloading operation to discharge oil and water from the discharge port.

The compressed air drier includes the electrically charged oil adsorbent accommodated between the desiccant cartridge and the case. The electrically charged oil adsorbent is electrically charged and thus adsorbs the oil mist suspended in the compressed air. This removes oil, which includes the oil mist, from the compressed air. As a result, the rate for removing oil from the compressed air is improved.

Preferably, in the compressed air drier, the electrically charged oil adsorbent is located upstream from the desiccant with respect to a flow of the compressed air during the loading operation.

In this case, the electrically charged oil adsorbent is located upstream from the desiccant in a flow passage through which the compressed air is passed during a loading operation. That is, the electrically charged oil adsorbent and the desiccant are arranged so that the compressed air entering the inlet during the loading operation is passed through the electrically charged oil adsorbent before passing through the desiccant. The electrically charged oil adsorbent first removes oil, which includes oil mist, from the compressed air. Then, the desiccant removes moisture from the compressed air. Thus, when the compressed air is passed through the desiccant, the amount of oil suspended in the compressed air has been decreased. This limits deterioration of the moisture adsorption performance of the desiccant that would be caused when the desiccant adsorbs oil.

Preferably, in the compressed air drier, the electrically charged oil adsorbent is in contact with the desiccant cartridge.

In this case, the electrically charged oil adsorbent is in contact with the desiccant cartridge. That is, there is no gap between the desiccant cartridge and the electrically charged oil adsorbent. Thus, compressed air passes through the electrically charged oil adsorbent. This increases the oil removal rate. Further, the position of the electrically charged oil adsorbent is fixed.

Preferably, in the compressed air drier, the electrically charged oil adsorbent is an electrically charged sponge.

In this case, the electrically charged sponge can be cleaned with a cleaning agent and thus be reused.

Effect of the Invention

The present invention increases the rate for removing oil from compressed air.

EMBODIMENTS OF THE INVENTION

One embodiment of a compressed air dryer will now be described with reference to FIGS. 1-5.

Figure 1:
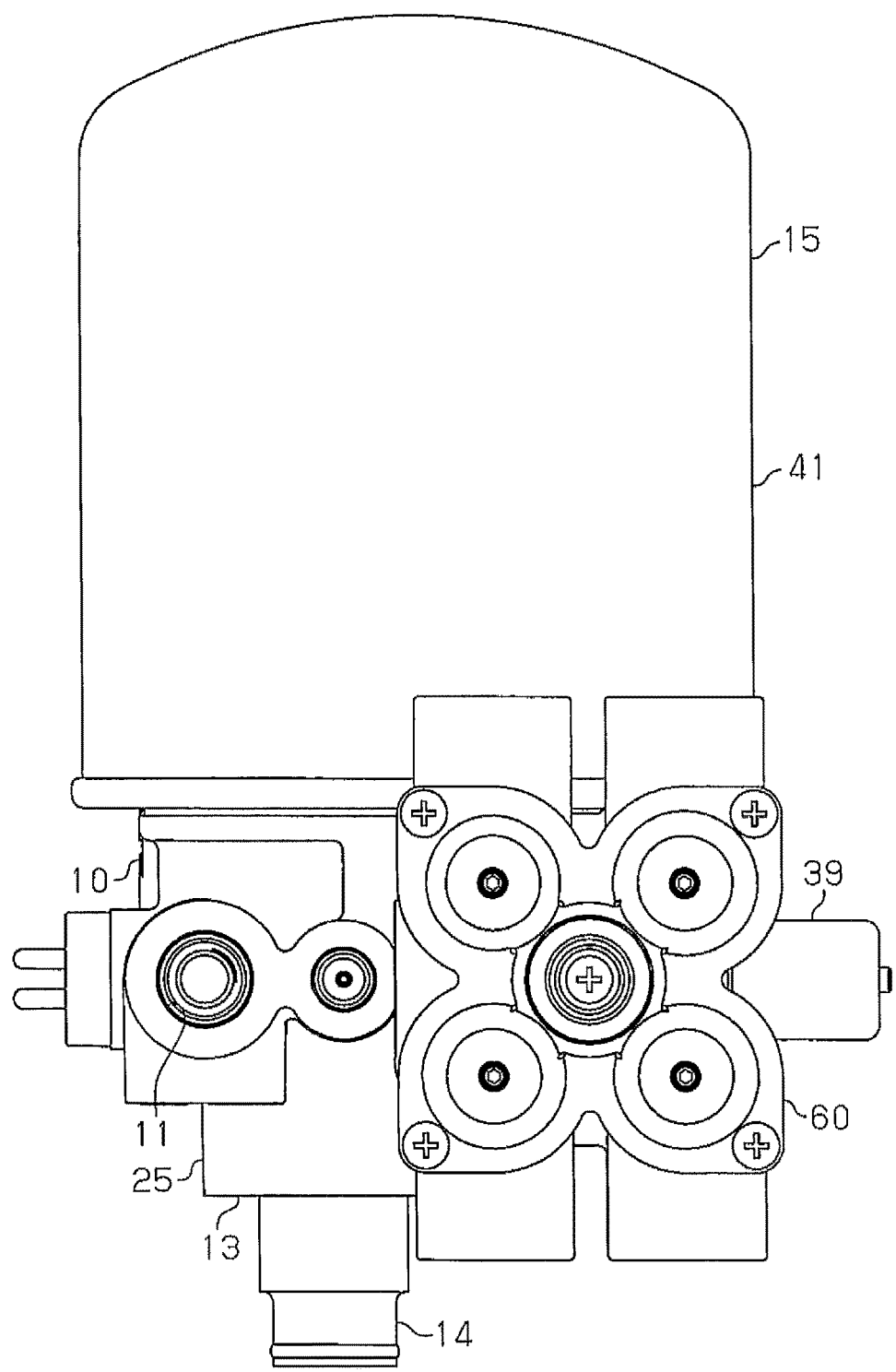
FIG. 1 is a front view showing the contour of a compressed air drier.
Figure 2:
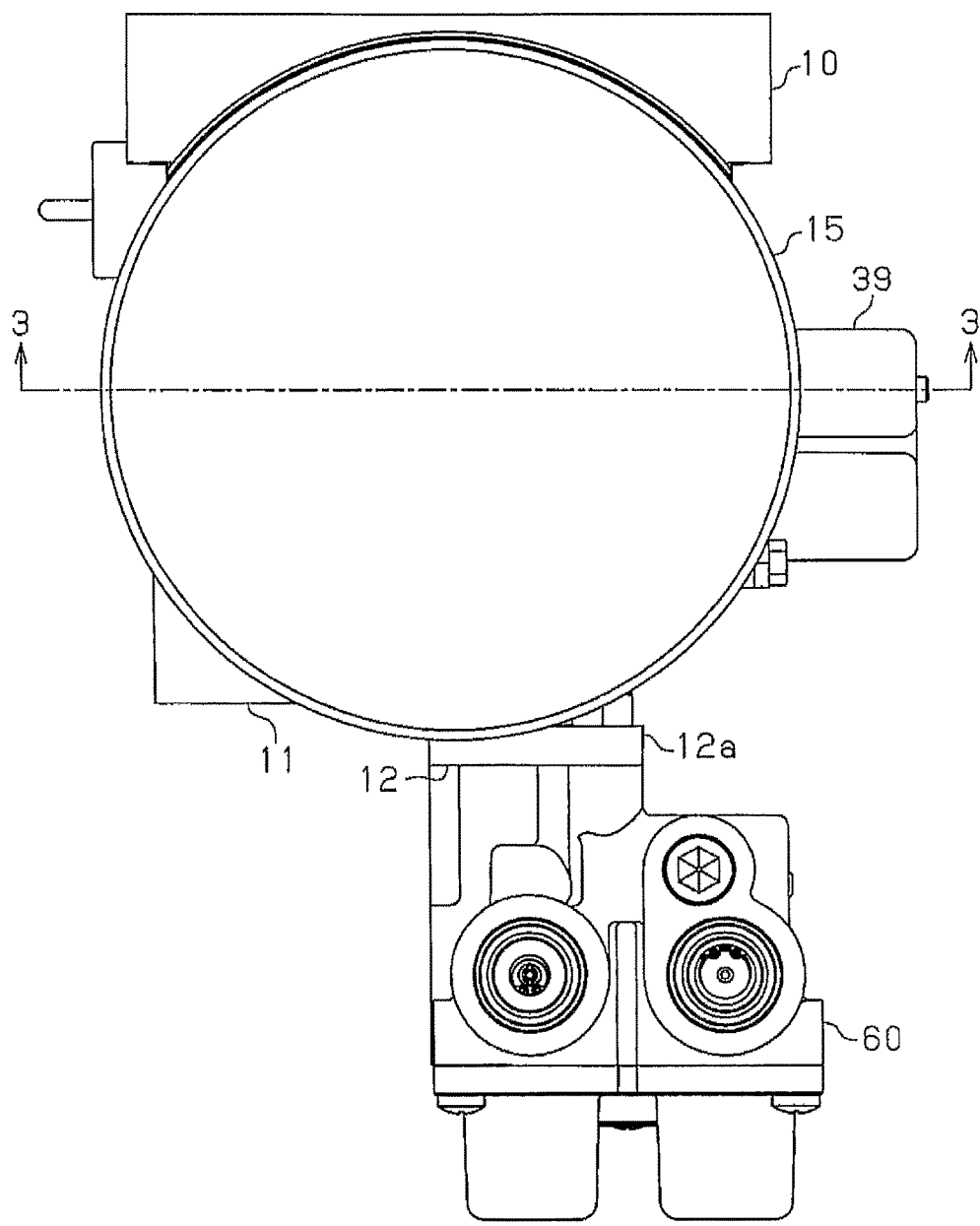
FIG. 2 is a plan view showing an upper surface of the compressed air drier of FIG. 1.

As shown in FIGS. 1 and 2, the compressed air drier includes a purge tank 15, which is cylindrical and has a bottom, and a support base 10, which supports the purge tank 15. The purge tank 15 is of a cartridge type and coupled in a removable manner to the support base 10.

A side portion of the support base 10 includes an inlet 11 and an outlet 12 that are directed in the same direction. Compressed air supplied from a compressor (not shown) enters the inlet 11. Dried compressed air is discharged out the outlet 12 into air tanks (not shown). The outlet 12 includes a flange 12a. A protection valve 60 is coupled to the flange 12a. The protection valve 60 includes pressure protection valves respectively corresponding to the air tanks (brake circuits). Accordingly, systems including the air tanks are independent from one another. When the pressure of the compressed air decreases in any one of the air tanks (a defect), the protection valve 60 closes the pressure protection valve (not shown) corresponding to the air tank and protects the other non-defective air tanks (brake circuits).

The support base 10 includes a pressure governor 39. The central part of a bottom portion 25 of the support base 10 includes a drain port 13, which serves as a discharge port for discharging oil and water during an unloading operation. The outlet 12 includes a check valve (not shown). The check valve opens the outlet 12 during a loading operation and closes the outlet 12 during an unloading operation.

Figure 3:
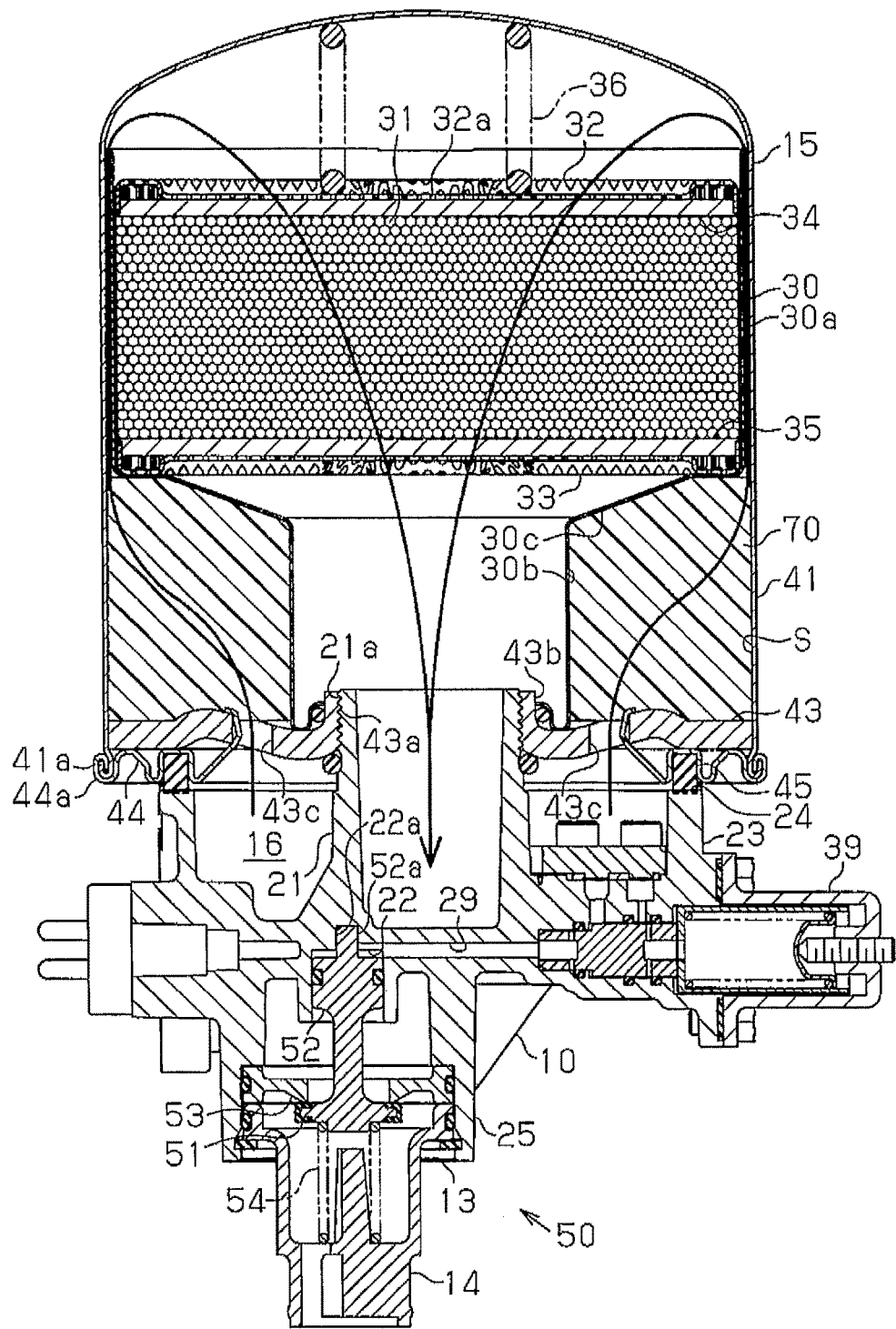
FIG. 3 is a cross-sectional view taken along line 3-3 in FIG. 1.

As shown in FIG. 3, the upper central part of the support base 10 defines a cylindrical inner tube 21. A male thread 21a is formed on the upper outer circumference of the inner tube 21. The upper peripheral portion of the support base 10 defines a cylindrical outer tube 23. The space between the inner tube 21 and the outer tube 23 functions as a first tank 16 that serves as a case for collecting the compressed air entering the inlet 11. The drain port 13 includes a drain valve device 50 that opens and closes the drain port 13. A gas discharge pipe 14 is coupled to and exposed from the drain port 13. The central part of the support base 10 includes a space 22. The pressure governor 39 allows compressed air to be supplied to the space 22 through a communication passage 29.

The drain valve device 50 includes a valve member 51, which opens and closes the drain port 13, and a piston 52, which moves the valve member 51. The valve member 51 moves integrally with the piston 52 and is set to rest on a valve seat 53 of the drain valve device 50. The piston 52 is set to close the space 22 in the support base 10 and urged toward the upper side (i.e., toward the space 22) by an urging spring 54. An upper portion of the piston 52 includes a cylindrical restriction piece 52a. The restriction piece 52a is fitted into a cylindrical guide groove 22a above the space 22. The piston 52 moves with the restriction piece 52a fitted in the guide groove 22a. This restricts the movement direction of the piston 52 and limits inclination of the piston 52 when moved.

The piston 52 is lowered when the pressure governor 39 supplies the space 22 with compressed air. When the valve member 51 is lowered together with the piston 52, the valve member 51 is moved away from the valve seat 53. This opens the drain port 13. When air is discharged from the space 22, the urging spring 54 lifts the piston 52. When the valve member 51 is lifted together with the piston 52, the valve member 51 comes into contact with the valve seat 53 and closes the drain port 13.

The drain valve device 50 closes the drain port 13 during a loading operation. When the pressure of the air tanks increases to a predetermined maximum pressure, the pressure governor 39 supplies compressed air to the space 22. Thus, the drain valve device 50 opens the drain port 13. Consequently, an unloading operation starts. During the unloading operation, the compressed air (purged air) in the purge tank 15 produces momentum that releases liquid, which includes oil and water, out of the open drain port 13. When the compressed air released from the drain port 13 lowers the pressure of the purge tank 15 to a minimum predetermined pressure, the supply of compressed air to the space 22 is stopped and the piston 52 is no longer forced downward. Thus, the urging force of the urging spring 54 closes the drain port 13.

The purge tank 15 includes a cylindrical outer case 41, a coupling plate 43, and a fastener 44. The outer case 41 includes a bottom portion and an opening that extends toward the support base 10. The coupling plate 43 closes the opening of the outer case 41 and is coupled to the support base 10. The fastener 44 fastens the coupling plate 43 to the outer case 41. A cylindrical desiccant cartridge 30, which is filled with a desiccant 31, is accommodated in the outer case 41. That is, the desiccant cartridge 30 is covered by the outer case 41. The desiccant cartridge 30 includes a large diameter portion 30a, which has an outer diameter that is substantially equal to the inner diameter of the outer case 41, and a small diameter portion 30b, which has an outer diameter that is approximately one half of the inner diameter of the outer case 41. A connection portion 30c connects the large diameter portion 30a and the small diameter portion 30b. The large diameter portion 30a of the desiccant cartridge 30 is filled with the desiccant 31.

The central part of the coupling plate 43 defines a cylindrical female thread portion 43b including a female thread 43a. The female thread 43a is engaged with the male thread 21a of the inner tube 21 on the support base 10. The female thread portion 43b of the coupling plate 43 is fastened with the inner tube 21 to couple the purge tank 15 to the support base 10. A peripheral portion 44a of the fastener 44 is extended around an open end 41a of the outer case 41 to fasten the coupling plate 43 to the fastener 44. A seal 45 is coupled to the lower portion of the fastener 44 in contact with an upper end 24 of the support base 10 to form a sealed space. The coupling plate 43 includes through holes 43c.

The granular desiccant 31 filled in the desiccant cartridge 30 is held between an upper plate 32 and a lower plate 33 in the vertical direction. An urging spring 36 is arranged in the outer case 41. The urging spring 36, which is arranged on a spring seat 32a of the upper plate 32, urges the upper plate 32 toward the lower plate 33. The upper plate 32 and the lower plate 33 each include through holes. An upper filter 34 is arranged between the upper plate 32 and the desiccant 31. A lower filter 35 is arranged between the desiccant 31 and the lower plate 33.

An electrically charged oil adsorbent 70 is accommodated between the desiccant cartridge 30 and the outer case 41. More specifically, the electrically charged oil adsorbent 70 is accommodated in the space S surrounded by the outer circumferential surface of the connection portion 30c of the desiccant cartridge 30, the outer circumferential surface of the small diameter portion 30b, the inner circumferential surface of the outer case 41, and the upper surface of the coupling plate 43.

The electrically charged oil adsorbent 70 is an electrically charged sponge and electrically charged when dry air is passed through its interior. The electrically charged oil adsorbent 70 attracts oil mist, which is suspended in the compressed air, with electrostatic force. When the attracted oil strikes the electrically charged oil adsorbent 70, oil mist and oil is removed from the compressed air. The electrically charged oil adsorbent 70 may be, for example, heat resistant, moisture resistant, and oil resistant. The electrically charged sponge may have superior chemical resistance and be reused when cleaned with a cleaning agent.

Figure 4:
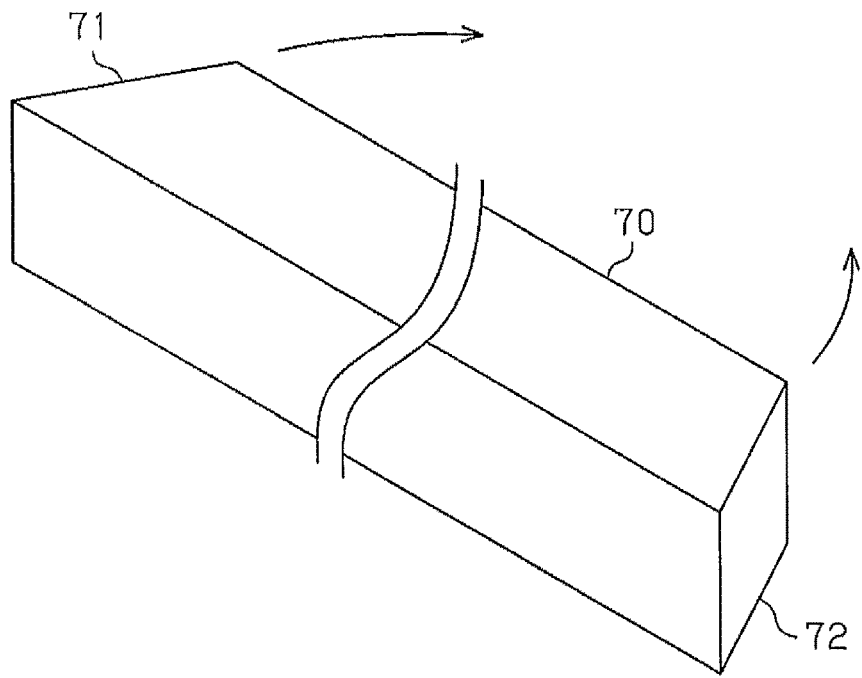
FIG. 4 is a perspective view showing the shape of an electrically charged oil adsorbent before the oil adsorbent is accommodated in the compressed air drier of FIG. 1.
Figure 5:
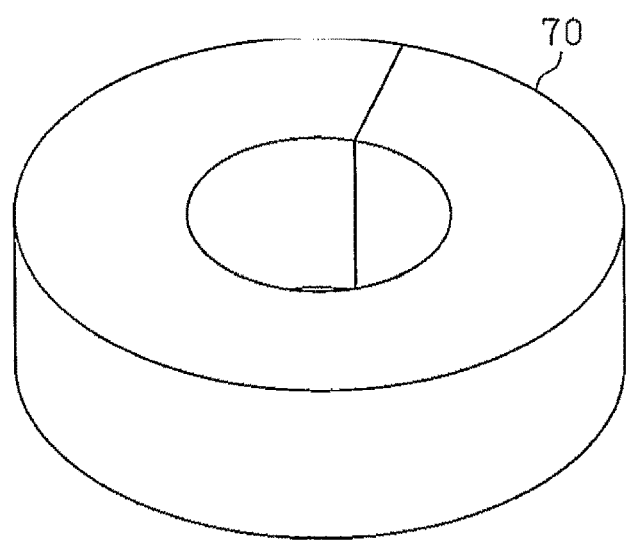
FIG. 5 is a perspective view showing the shaped of the electrically charged oil adsorbent when accommodated in the compressed air drier of FIG. 1.

As shown in FIG. 4, the electrically charged oil adsorbent 70 is box-shaped and includes two ends 71 and 72 that are diagonally cut. As shown in FIG. 5, the electrically charged oil adsorbent 70 is bent to be ring-shaped when accommodated in the space S. The two ends 71 and 72 of the electrically charged oil adsorbent 70 are diagonally formed so that the outer circumferential portion is longer than the inner circumferential portion in the ring. This facilitates contact of the two ends 71 and 72 of the electrically charged oil adsorbent 70 when bent to be ring-shaped for accommodation in the space S.

As shown in FIG. 3, when accommodated in the space S, the electrically charged oil adsorbent 70 contacts the outer circumferential surface of the connection portion 30c of the desiccant cartridge 30, the outer circumferential surface of the small diameter portion 30b, and the inner circumferential surface of the outer case 41. The electrically charged oil adsorbent 70 is located upstream from the desiccant 31 with respect to the flow of the compressed air during a loading operation.

The operation of the compressed air dryer will now be described with reference to FIG. 3.

As shown in FIG. 3, a loading operation starts when the pressure of the purge tank 15 becomes equal to a predetermined minimum pressure and ends when the pressure of the air tanks becomes equal to a predetermined maximum pressure. During the loading operation, the inlet 11 and the outlet 12 open, and the drain port 13 closes. An unloading operation starts when the pressure of the air tanks becomes equal to a predetermined maximum pressure and ends when the pressure of the purge tank 15 becomes equal to a predetermined minimum pressure. During the unloading operation, the inlet 11 and the outlet 12 close, and the drain port 13 opens.

During the loading operation, the compressed air from the compressor that enters the inlet 11 flows into the first tank 16. The compressed air that flows into the first tank 16 enters the space S through the through holes 43c in the coupling plate 43 and is passed through the electrically charged oil adsorbent 70. This removes oil, which includes oil mist, and dust from the compressed oil.

Then, the compressed air that has been passed through the electrically charged oil adsorbent 70 passes through the gap between the large diameter portion 30a of the desiccant cartridge 30 and the outer case 41 from the lower side to the upper side and enters the desiccant cartridge 30. The compressed air that enters the desiccant cartridge 30 is passed through the through holes of the upper plate 32 and is passed through the large diameter portion 30a, which is filled with the desiccant 31. The desiccant 31 removes moisture from the compressed air, that is, dries the compressed air. The dried compressed air passed through the through holes of the lower plate 33 enters the inner tube 21 of the support base 10 and is collected in the air tanks through the outlet 12. The dried compressed air in the air tanks is used to actuate, for example, devices of air brake systems.

When the pressure of the air tanks reaches the predetermined maximum pressure, the pressure governor 39 supplies the space 22 with compressed air. The drain valve device 50 lowers the valve member 51 and opens the drain port 13. This shifts the compressed air drier from the loading operation to an unloading operation.

The drain valve device 50 opens the drain port 13 in the compressed air dryer during the unloading operation. When the drain port 13 opens, the compressed air (purged air) in the purge tank 15 produces momentum that releases liquid, which includes oil and water, out of the drain port 13.

More specifically, the dried compressed air collected in the purge tank 15 is passed through the desiccant 31 to remove moisture from the desiccant 31 and regenerate the desiccant 31. The compressed air that has been passed through the desiccant 31 is passed through the gap between the large diameter portion 30a of the desiccant cartridge 30 and the outer case 41 and then passed through the electrically charged oil adsorbent 70. The compressed air that has been passed through the electrically charged oil adsorbent 70 is then passed through the first tank 16, the drain valve device 50, and the gas discharge pipe 14 and discharged to the outside together with oil and water.

As the pressure of the purge tank 15 approaches the atmospheric pressure when purged air is discharged together with oil and water from the drain port 13, the discharge of purged air, oil, and water stops. In the drain valve device 50, when the pressure of the purge tank 15 reaches a predetermined minimum pressure, the supply of compressed air from the pressure governor 39 is stopped. This discharges the air from the space 22, and the urging force of the urging spring 54 closes the drain port 13. This shifts the compressed air drier from the unloading operation to a loading operation.

As described above, the present embodiment has the advantages described below.

(1) The compressed air drier includes the electrically charged oil adsorbent 70 that is accommodated between the desiccant cartridge 30 and the outer case 41. More specifically, the electrically charged oil adsorbent 70 is electrically charged. Thus, the electrically charged oil adsorbent 70 adsorbs the oil mist suspended in the compressed air. This removes oil, including oil mist, from the compressed air. Thus, the rate for removing oil from the compressed air is increased.

(2) The electrically charged oil adsorbent 70 is located upstream from the desiccant 31 with respect to the flow of compressed air during a loading operation. That is, the electrically charged oil adsorbent 70 and the desiccant 31 are arranged so that the compressed air entered from the inlet 11 is passed through the electrically charged oil adsorbent 70 before passing through the desiccant 31. The electrically charged oil adsorbent 70 removes oil, which includes oil mist, from the compressed air. Then, the desiccant 31 removes moisture from the compressed air. Thus, the amount of oil suspended in the compressed air has been decreased when the compressed air is passed through the desiccant 31. This limits deterioration of the moisture adsorption performance of the desiccant 31 that would be caused when the desiccant adsorbs oil.

(3) The electrically charged oil adsorbent 70 is in contact with the desiccant cartridge 30. That is, there is no gap between the desiccant cartridge 30 and the electrically charged oil adsorbent 70. Thus, compressed air passes through the electrically charged oil adsorbent 70. This increases the oil removal rate. Further, the position of the electrically charged oil adsorbent 70 is fixed.

(4) The electrically charged oil adsorbent 70 is an electrically charged sponge. The electrically charged sponge can be cleaned with a cleaning agent and thus be reused.

The above embodiment may be modified and embodied in the following forms.

In the above embodiment, an electrically charged sponge is used as the electrically charged oil adsorbent 70. However, the electrically charged oil adsorbent 70 does not have to be an electrically charged sponge as long as it is electrically charged and adsorbs oil.

In the above embodiment, the electrically charged oil adsorbent 70 contacts the desiccant cartridge 30. However, the electrically charged oil adsorbent 70 may be arranged in the space S so that there is a small gap between the electrically charged oil adsorbent 70 and the desiccant cartridge 30.

In the above embodiment, the desiccant cartridge 30 includes the large diameter portion 30a and the small diameter portion 30b. However, a desiccant cartridge is not limited to the above shape and may have any shape as long as it can be filled with the desiccant 31. The electrically charged oil adsorbent 70 is also accommodated between the inner circumferential surface of the outer case 41 and the outer circumferential surface of the desiccant cartridge 30.

In the above embodiment, the electrically charged oil adsorbent 70 is located upstream from the desiccant 31 with respect to the flow of compressed air during the loading operation. The electrically charged oil adsorbent 70 may be located downstream from the desiccant 31 with respect to the flow of compressed air during the unloading operation.

DESCRIPTION OF REFERENCE CHARACTERS 10) support base, 11) inlet, 12) outlet, 12a) flange, 13) drain discharge port, 14) gas discharge pipe, 15) purge tank, 16) first tank, 21) inner tube, 21a) male thread, 21b) male thread portion, 22) space, 22a) guide groove, 23) outer tube, 24) upper end, 25) bottom portion, 29) communication passage, 30) desiccant cartridge, 30a) large diameter portion, 30b) small diameter portion, 30c) connection portion, 31) desiccant, 32) upper plate, 32a) spring seat, 33) lower plate, 34) upper filter, 35) lower filter, 36) urging spring, 39) pressure governor, 41) outer case, 41a) open end, 43) coupling plate, 43a) female thread, 43b) female thread portion, 43c) through holes, 44) fastener, 44a) peripheral portion, 45) seal, 50) drain valve device, 51) valve member, 52) piston, 52a) restriction piece, 53) valve seat, 54) urging spring, 60) protection valve, 70) oil adsorbent, 71 and 72) ends.

The invention claimed is:
1. A compressed air drier comprising:
 a support base including an inlet for compressed air from a compressor, an outlet for the compressed air, and a discharge port for oil and water including a drain valve device;
 a desiccant cartridge coupled to the support base;
 a case that covers the desiccant cartridge and is coupled to the support base; and
 an electrically charged oil adsorbent accommodated between the desiccant cartridge and the case,
 wherein the desiccant cartridge includes an upper filter and a lower filter,
 wherein a desiccant is filled between the upper filter and the lower filter,
 wherein, in a loading operation, the compressed air drier dries the compressed air entering the inlet with the desiccant and discharges the dried compressed air from the outlet, and
 wherein, in an unloading operation, the compressed air drier passes the compressed air through the lower filter, the desiccant, and the upper filter in the desiccant cartridge and the electrically charged oil adsorbent to discharge oil and water collected by the lower filter, the desiccant, the upper filter, and the electrically charged oil adsorbent from the discharge port.

2. The compressed air drier according to claim 1, wherein the electrically charged oil adsorbent is located upstream from the desiccant with respect to a flow of the compressed air during the loading operation.

3. The compressed air drier according to claim 1, wherein the electrically charged oil adsorbent is in contact with the desiccant cartridge.

4. The compressed air drier according to claim 1, wherein the electrically charged oil adsorbent is an electrically charged sponge.

5. The compressed air drier according to claim 1, wherein the case has a cylindrical shape,
 wherein the desiccant cartridge includes a large diameter portion having an outer diameter that is approximately equal to an inner diameter of the case and a small diameter portion having an outer diameter that is less than the inner diameter of the case, and
 wherein the desiccant is filled in the large diameter portion.

6. The compressed air drying device according to claim 5, wherein the electrically charged oil adsorbent is accommodated between the small diameter portion and the case.

7. The compressed air drying device according to claim 6, wherein a gap is formed between the large diameter portion and the case,
 wherein, in the loading operation, the compressed air introduced from the inlet passes through the gap via the electrically charged oil adsorbent, and enters the desiccant cartridge.

8. The compressed air drying device according to claim 1, wherein the desiccant cartridge includes an upper plate and a lower plate, wherein the upper filter is provided between the upper plate and the desiccant, and wherein the lower filter is provided between the lower plate and the desiccant.

* * * * *